(12) United States Patent
Baek et al.

(10) Patent No.: US 11,827,178 B2
(45) Date of Patent: Nov. 28, 2023

(54) METHOD AND SYSTEM FOR PRECISE POSITION ESTIMATION FOR VEHICLE OVER UWB

(71) Applicant: AMOTECH CO., LTD., Incheon (KR)

(72) Inventors: Hyungil Baek, Yongin-si (KR); Kyunghyun Ryu, Seoul (KR); Jaeil Park, Hwaseong-si (KR); Chanwoo Lee, Suwon-si (KR); Hanju Do, Pyeongtaek-si (KR)

(73) Assignee: AMOTECH CO., LTD., Incheon (KR)

( * ) Notice: Subject to any disclaimer, the term of this patent is extended or adjusted under 35 U.S.C. 154(b) by 459 days.

(21) Appl. No.: 17/290,731

(22) PCT Filed: Oct. 22, 2019

(86) PCT No.: PCT/KR2019/013894
§ 371 (c)(1),
(2) Date: Apr. 30, 2021

(87) PCT Pub. No.: WO2020/091286
PCT Pub. Date: May 7, 2020

(65) Prior Publication Data
US 2022/0001836 A1    Jan. 6, 2022

(30) Foreign Application Priority Data

Oct. 31, 2018 (KR) .......................... 10-2018-0132305

(51) Int. Cl.
*B60R 25/24* (2013.01)
*G01S 5/02* (2010.01)

(52) U.S. Cl.
CPC .......... *B60R 25/245* (2013.01); *G01S 5/0205* (2013.01); *B60R 2325/10* (2013.01)

(58) Field of Classification Search
CPC ............................. B60R 25/245; G01S 5/0202
(Continued)

(56) References Cited

U.S. PATENT DOCUMENTS 11,765,561 B2 *  9/2023  Tiwari ................... H04W 4/46
                                                    370/329
2018/0099643 A1  4/2018  Golsch et al.
(Continued)

FOREIGN PATENT DOCUMENTS

EP    3457164 A1 *  3/2019
JP    2018-071190     5/2018
(Continued)

OTHER PUBLICATIONS

International Search Report dated Feb. 4, 2020 in International Patent Application No. PCT/KR2019/013894.
(Continued)

*Primary Examiner* — Harry K Liu

(57) ABSTRACT

The present invention is to perform position estimation in relation to a vehicle and a key module by using an ultra-wideband (UWB) and, specifically, relates to a method and system for precise position estimation for a vehicle, whereby position can be estimated, with effects minimized that result from the type of the vehicle and the quality of exterior metal of the vehicle. The method for precise position estimation for a vehicle over a UWB comprises the steps of: receiving, by an LIN transceiver, a position estimation-related signal delivered from an internal part of a vehicle, and transmitting the signal to a UWB transceiver to start the position estimation; the control unit measuring a predetermined number of times reception signal delays occurring in relation to a UWB tag, while turning on or off the switch of each of M antennas at predetermined time intervals; determining antennas at which the value of a corresponding reception signal delay measured the predetermined number of times is lower than a preset threshold; measuring the distances between the determined antennas and the distances between each of the antennas and the UWB tag; determining position angles with respect to the UWB tag by using a two-way (Continued)

ranging (TWR) positioning method on the basis of the distances between the antennas and the distances between each of the antennas and the UWB tag; measuring the distances between the UWB tag and UWB anchors measured using a triangulation method according to the M anchors and UWB tag; and estimating the position of the UWB tag on the basis of the position angles with respect to the UWB tag and the distances between the N UWB anchors and the UWB tag.

8 Claims, 8 Drawing Sheets

(58) Field of Classification Search
USPC .......................................................... 342/451
See application file for complete search history.

(56) References Cited

U.S. PATENT DOCUMENTS

| 2018/0188349 | A1 | 7/2018 | Lee et al. |
| 2019/0256047 | A1 | 8/2019 | Iwashita et al. |
| 2020/0132807 | A1* | 4/2020 | Kong .................... B60R 25/245 |

FOREIGN PATENT DOCUMENTS

| KR | 10-2012-0019040 | 3/2012 |
| KR | 10-1750906 | 7/2017 |
| KR | 10-2018-0077479 | 7/2018 |

OTHER PUBLICATIONS

Written Opinion of the International Searching Authority dated Feb. 4, 2020 in International Patent Application No. PCT/KR2019/013894.

* cited by examiner

[FIG. 1A]
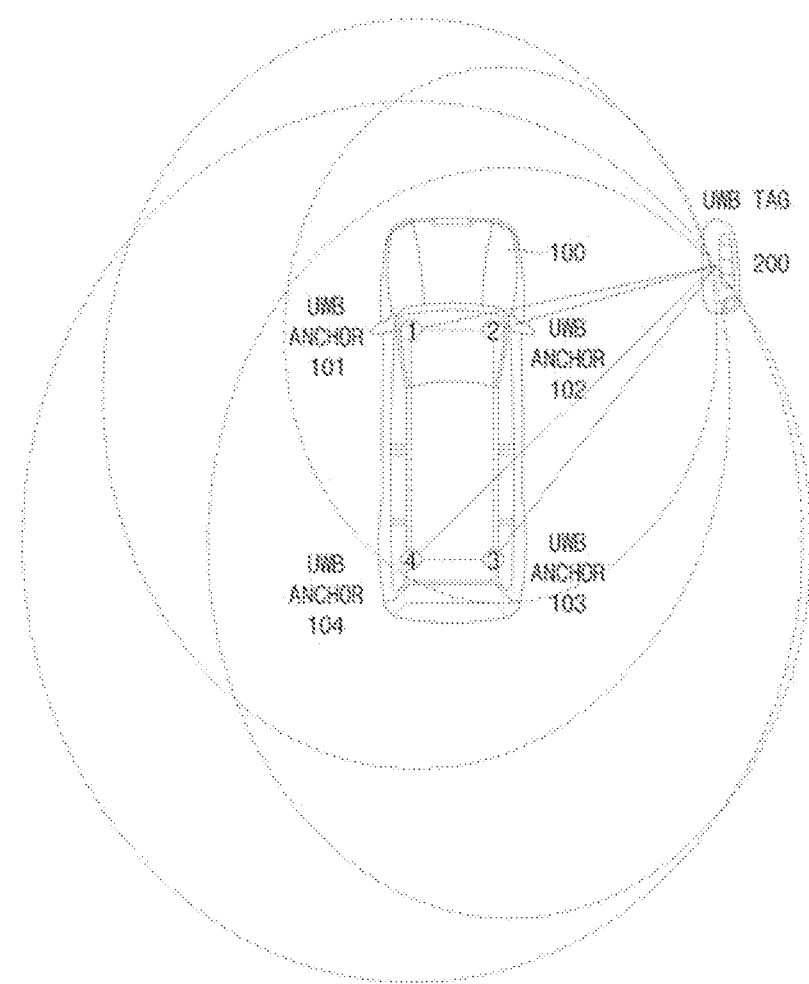

[FIG. 1B]
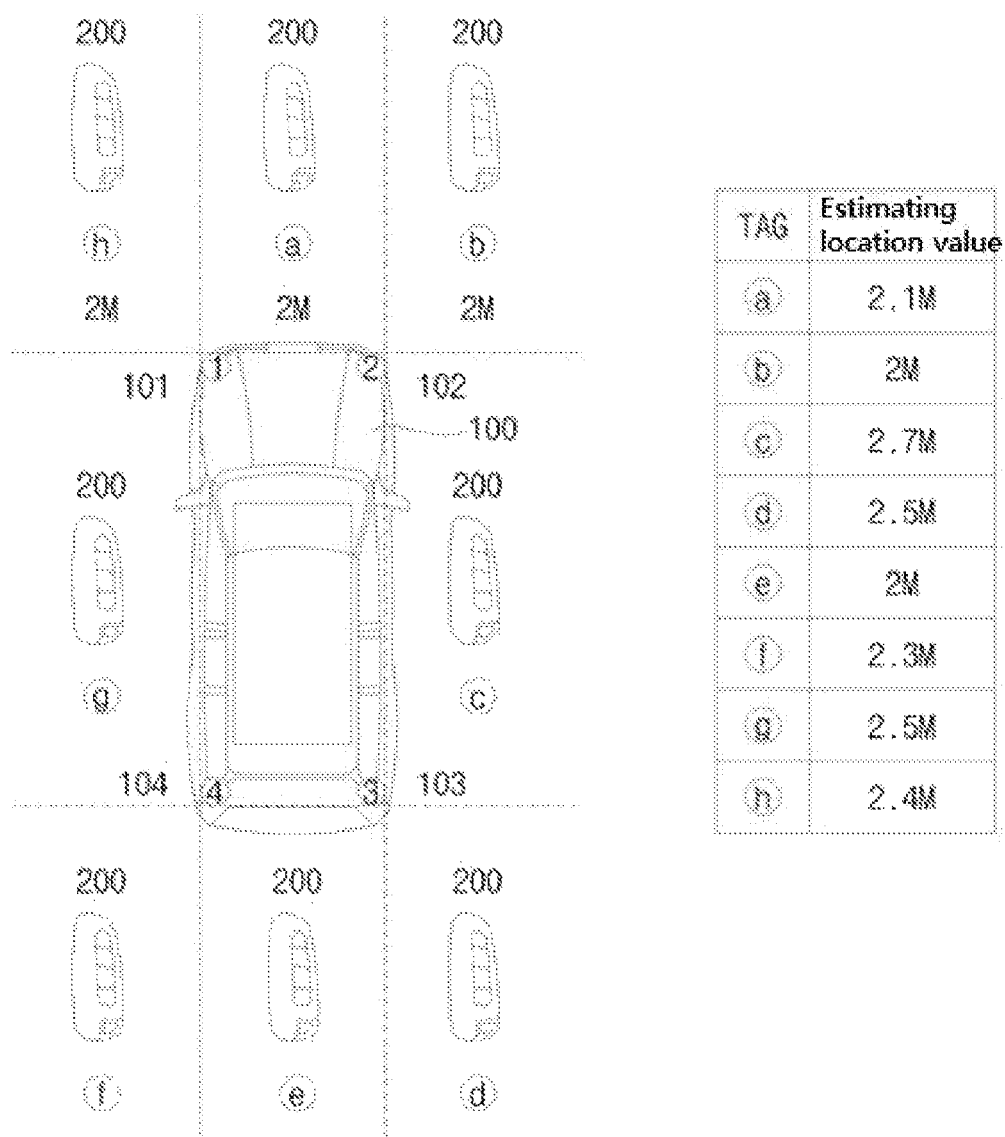

[FIG. 2]
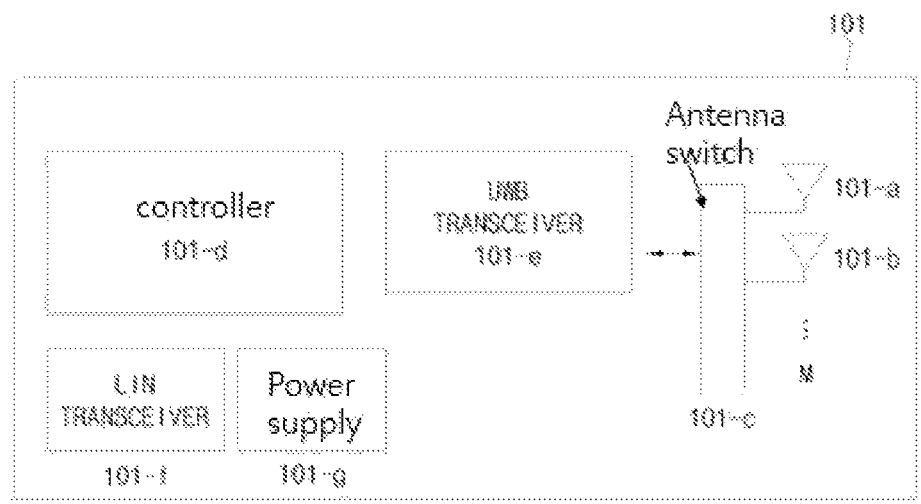

[FIG. 3]
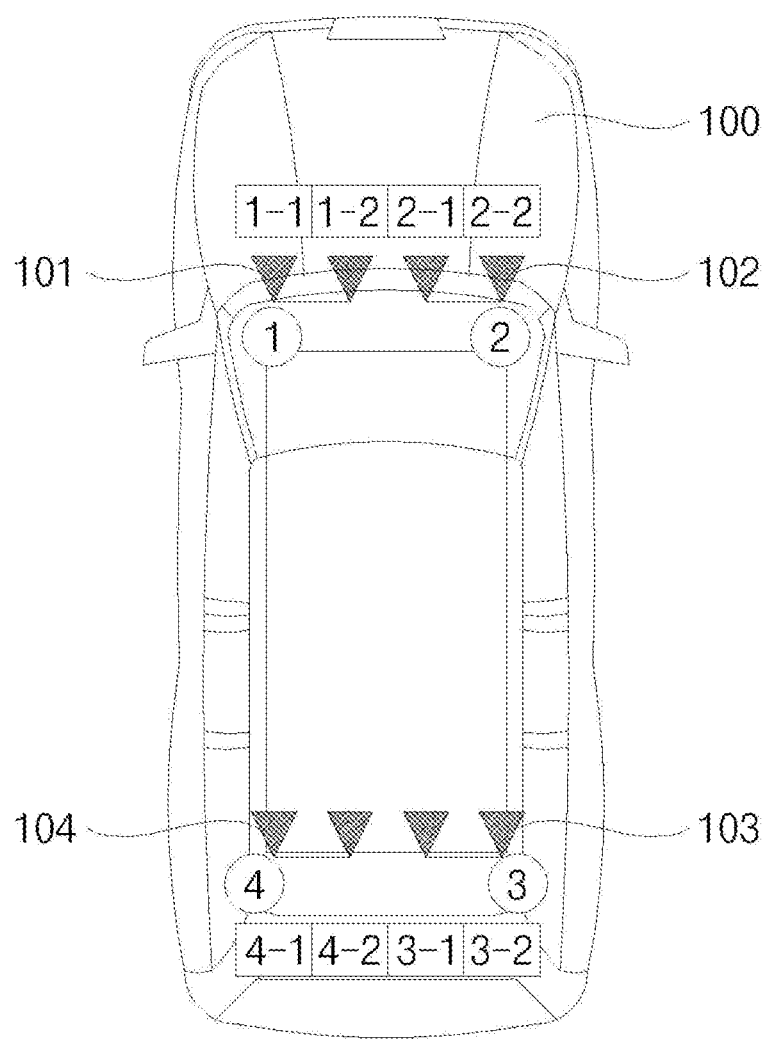

[FIG. 4A]
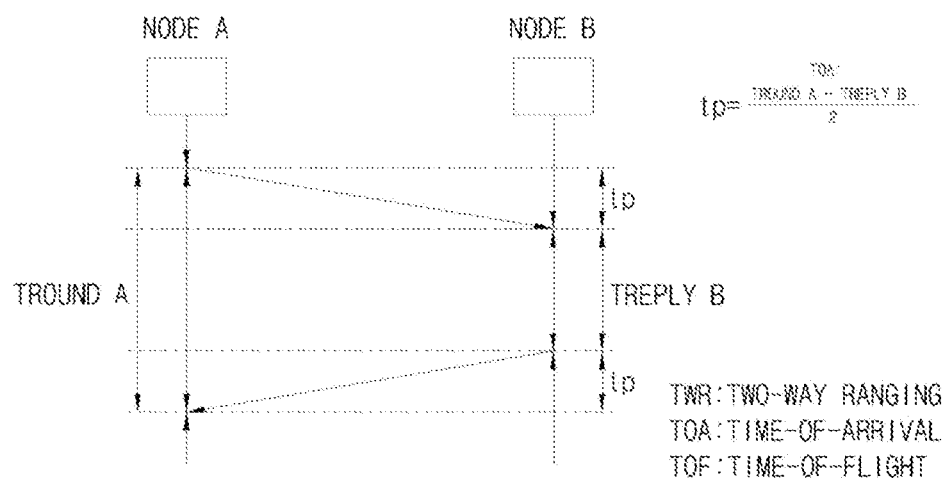

[FIG. 4B]
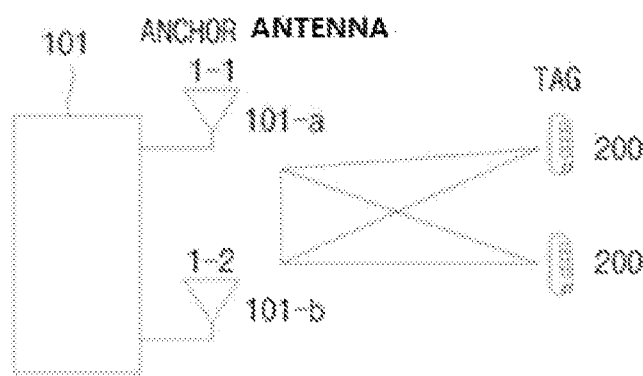
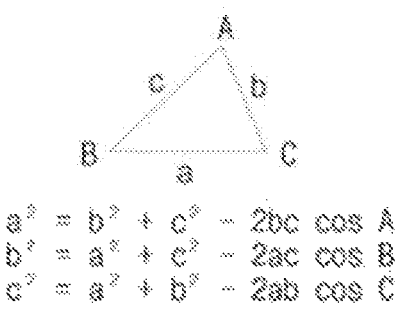

[FIG. 5]
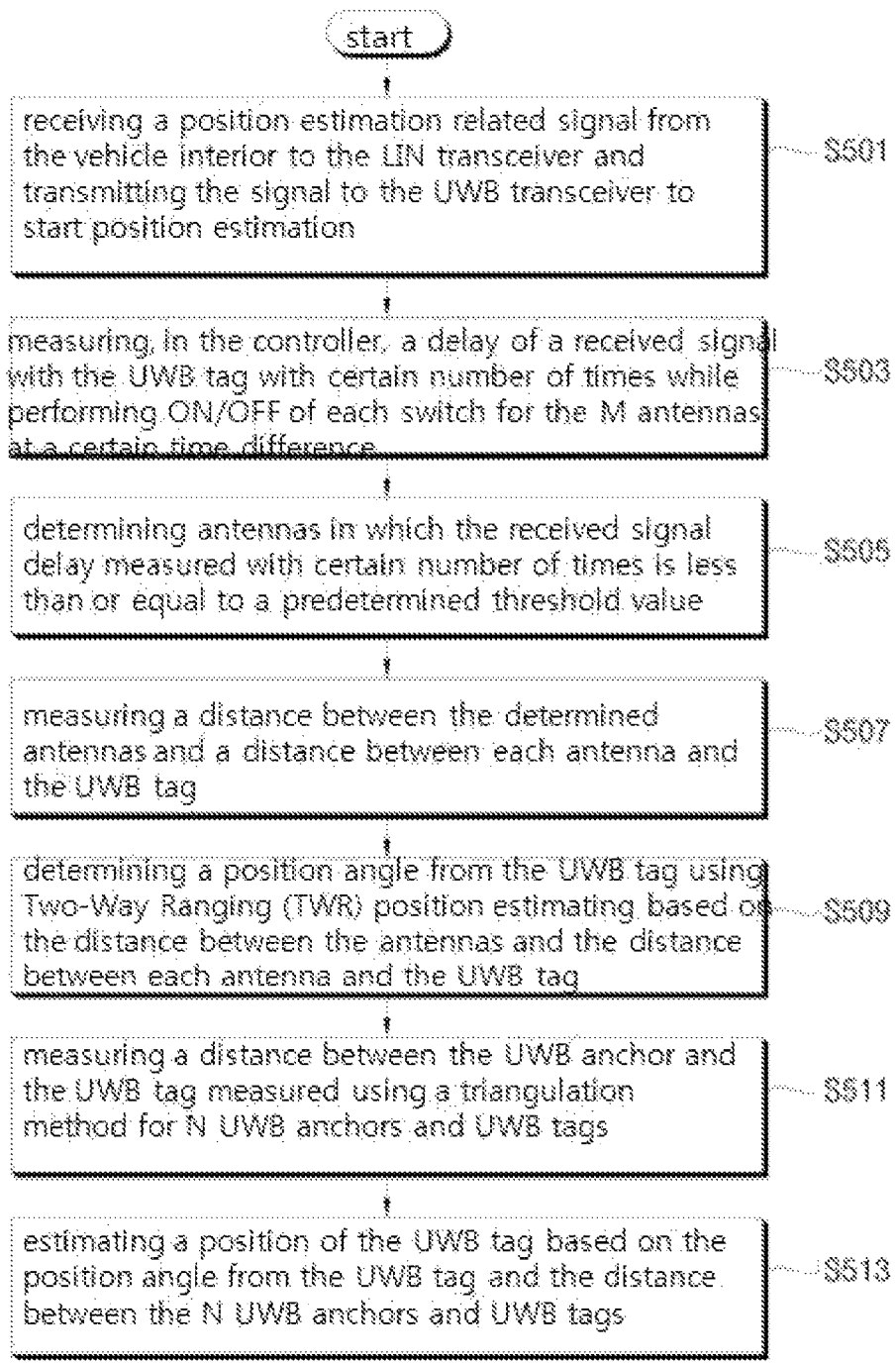

[FIG. 6]
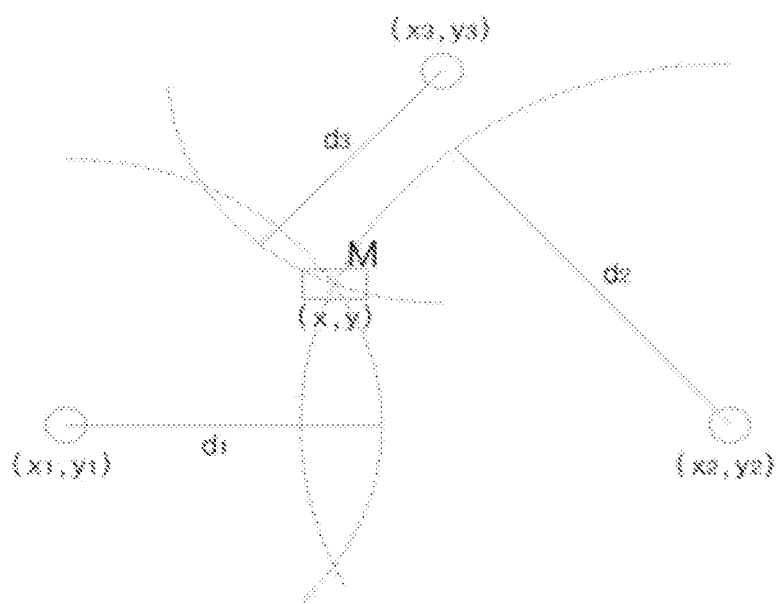
$$d_1^2 = (x - x_1)^2 - (y - y_1)^2 \qquad (1)$$
$$d_2^2 = (x - x_2)^2 - (y - y_2)^2 \qquad (2)$$
$$d_3^2 = (x - x_3)^2 - (y - y_3)^2 \qquad (3)$$

METHOD AND SYSTEM FOR PRECISE POSITION ESTIMATION FOR VEHICLE OVER UWB

TECHNICAL FIELD

The present invention is for estimating a position between a vehicle and a smart key using an Ultra Wide Band (UWB) and in particular, a precise position estimation method and system for the vehicle capable of estimating the position by minimizing the influence of the type of vehicle and the outer metal material of the vehicle.

DISCUSSION OF THE RELATED ART

A technology for estimating the position of a specific user or object is being used in various communication systems such as Location Based Service (LBS), and it is in the spotlight as an important issue in wireless communication technology.

In particular, various position estimation techniques have been developed between a vehicle and vehicle peripheral devices. Recently, an Ultra Wide Band (UWB) method capable of precise position estimating has been widely used.

The UWB refers to a radio technology that uses a frequency band of 500 MHz or more, or that a number defined as a specific fractional bandwidth is 25% or more. The specific fractional bandwidth refers to the bandwidth of the signal compared to the center frequency. That is, the UWB is the radio technology that uses a broadband frequency, has various advantages such as high resolution of distance, transparency, strong immunity to narrowband noise, and is capable of coexisting with other devices that share the frequency.

A representative position estimation technique is a Time of Arrival (TOA) triangulation method, which estimates a distance between a moving object and at least three reference points. Then, by creating three circles with radius of three reference points and the estimated three distances, an intersection of the circles is determined as the position of the moving object.

The distance is generally estimated using a delay of signal transmitted/received between the reference point and the moving object. However, the estimated distance may become longer than the actual distance in this process.

In particular, in an indoor environment where multi-path due to obstacles is a problem, there is possibility that a serious error may occur due to a time difference of several milliseconds. In case of the vehicle, measurement error and deviation may occur due to path loss to the metal part outside the vehicle.

Therefore, the method and system for precise position estimation using the UWB suitable for the vehicle environment must be sought.

SUMMARY

Technical Problem

It is an object of the present disclosure to provide a method and system for estimating a position between a vehicle and a smart key using UWB by minimizing an influence of a type of vehicle and outer metal material of vehicle.

Technical Solution

To solve the above problem and defects, the present disclosure provides a vehicle UWB precision position estimation system comprising a UWB tag installed in a key module; and N UWB anchors installed in a vehicle, wherein a UWB anchor including a LIN transceiver to receive a signal related to position estimation from an inside of the vehicle, a UWB transceiver that receives the signal related to position estimation transmitted from the LIN transceiver and performs position estimation with the UWB tag, M antennas connected to the UWB transceiver and spaced apart at regular intervals so that there is no mutual interference, a switch for performing on/off of M antennas at a predetermined time difference, a controller for performing the switch ON/OFF with the predetermined time difference, measuring a delay of received signal from the UWB tag with certain number of times, determining antennas in which the measured delay of received signal with the certain number of times is less than or equal to a predetermined threshold value, determining a UWB tag position angle based on distances between the determined antennas and distances between each antenna and UWB tag using Two-Way Ranging (TWR) position estimating, measuring the distance between UWB anchor and UWB tag measured using a triangulation method for N UWB anchors installed in the vehicle and UWB tag, and controlling said each device to estimate the UWB tag position based on the measured position angle and distance, and power supply for supplying power.

In an embodiment of the present invention, wherein the M antennas are directional or omni-directional.

In an embodiment of the present invention, wherein the M antennas are installed in different directions by adjusting the angle.

In an embodiment of the present invention, if the M antennas are directional antennas, the controller determines the directivity of the antennas by transmitting a reference signal from the UWB anchor to the UWB tag and recognizing a direction of the UWB tag.

To solve the above problem and defects, the present disclosure provides A method of vehicle UWB precision position estimation, comprising: wherein a system includes a UWB tag installed in a key module and N UWB anchors installed in a vehicle, and a UWB anchor includes a LIN transceiver to receive a signal related to position estimation from an inside of the vehicle, a UWB transceiver that receives the signal related to position estimation transmitted from the LIN transceiver, M antennas connected to the UWB transceiver and spaced apart at regular intervals so that there is no mutual interference, a switch for operating of the M antennas, and a controller for controlling above devices, receiving a position estimation related signal from the vehicle interior to the LIN transceiver and transmitting the signal to the UWB transceiver to start position estimation; measuring, in the controller, a delay of a received signal with the UWB tag with certain number of times while performing ON/OFF of each switch for the M antennas at a certain time difference; determining antennas in which the received signal delay measured with certain number of times is less than or equal to a predetermined threshold value; measuring a distance between the determined antennas and a distance between each antenna and the UWB tag; determining a position angle from the UWB tag using (Two-Way Ranging) TWR position estimating based on the distance between the antennas and the distance between each antenna and the UWB tag; measuring a distance between the UWB anchor and the UWB tag measured using a triangulation method for N UWB anchors and UWB tags; and estimating a position of the UWB tag based on the position angle from the UWB tag and the distance between the N UWB anchors and UWB tags.

In an embodiment of the present invention, wherein the M antennas are directional or omni-directional.

In an embodiment of the present invention, wherein the M antennas are installed in different directions by adjusting the angle.

In an embodiment of the present invention, if the M antennas are directional antennas, the controller determines the directivity of the antennas by transmitting a reference signal from the UWB anchor to the UWB tag and recognizing a direction of the UWB tag.

Advantageous Effects

As described above, the method and system for estimating the position between the vehicle and the smart key using UWB according to the embodiments of the present invention minimizes measurement errors and deviations that may occur due to the type of vehicle and the outer metal material of the vehicle, thereby ensuring accurate positioning.

In addition, it is possible to use simpler and fewer modules to accurately estimate the position between the vehicle and the smart key, resulting in cost reduction.

BRIEF DESCRIPTION OF THE DRAWINGS

FIG. 1A to 1B are diagrams illustrating a method of estimating a position UWB anchors of a vehicles and a UWB tag of a smart key and error occurring situation.

FIG. 2 is a block diagram showing the structure of UWB anchor according to an embodiment of the present invention.

FIG. 3 is a conceptual diagram of the UWB anchor installed in the vehicle according to an embodiment of the present invention.

FIG. 4A to 4B are views for explaining a method of estimating the position between the UWB anchor and the UWB tag according to an embodiment of the present invention.

FIG. 5 is a flowchart illustrating the method of estimating the position between the UWB anchor and the UWB tag according to an embodiment of the present invention.

FIG. 6 is a diagram illustrating a general triangulation method for estimating a real-time position of a moving object.

DETAILED DESCRIPTION OF THE EMBODIMENTS

With respect to the embodiments of the present disclosure disclosed in this specification, specific structural or functional descriptions are exemplified for the purpose of describing the embodiments of the present disclosure only, and the embodiments of the present disclosure may be implemented in various forms and should not be construed as being limited to the embodiments described in the specification.

Since the present disclosure can apply various changes and have various forms, specific embodiments are illustrated in the drawings and will be described in detail in this specification. However, this is not intended to limit the present disclosure to a specific form of disclosure, it is to be understood as including all changes, equivalents, or substitutes included in the spirit and scope of the present disclosure.

Terms such as a first and a second may be used to describe various elements, but the elements should not be limited by the terms. The terms may be used for the purpose of distinguishing one component from another component. For example, without departing from the scope of the present disclosure, the first element may be referred to as the second element, and similarly, the second element may be referred to as the first element.

When a component is referred to as being "connected" to another component, it may be directly connected the other component, but other components may exist in the middle. On the other hand, when a component is referred to as being "directly connected" to another component, it should be understood that there is no other component in the middle. Other expression describing the relationship between components, such as "between" and "directly between" or "adjacent to" and "directly adjacent to" should be interpreted as well.

The terms used in the application are only used to describe specific embodiments and are not intended to limit the present disclosure. Singular expressions include plural expressions unless the context clearly indicates otherwise. In the present application, terms such as "comprise" or "having" are intended to designate the presence of a set feature, number, step, action, component, part, or combination thereof, but one or more other features or it is to be understood that the presence or addition of numbers, steps, actions, components, parts, or combinations thereof does not preclude the possibility of preliminary exclusion.

Unless otherwise defined, all terms used herein, including technical or scientific terms, have the same meaning as commonly understood by one of ordinary skill in the technical field to which the present disclosure belongs. Unless otherwise defined, all terms used therein, including technical or scientific terms, have the same meaning as commonly understood by one of ordinary skill in the technical field to which the present disclosure belongs. Terms such as those defined in commonly used dictionaries should be interpreted as having meanings consistent with the meanings in the context of the related technology and should be interpreted as ideal or excessively formal meanings unless explicitly defined in this application.

Meanwhile, when a certain embodiment can be implemented differently, a function or operation specified in a specific block may occur differently from the order specified in the flowchart. For example, two consecutive blocks may actually be executed at the same time, or the blocks may be executed backwards depending on a related function or operation.

Hereinafter, exemplary embodiments of the present disclosure will be described in detail with reference to the accompanying drawings, which will be readily apparent to those skilled in the art to which the present disclosure pertains. The present disclosure may be embodied in many different forms and is not limited to the embodiments described herein. In the drawings, parts not relating to the description are omitted for clarifying the present disclosure, and the same reference numerals are assigned to the same or similar components throughout the specification.

FIG. 1A to 1B are diagrams for showing a situation where an estimating error and deviation occurs between (Ultra Wide Band) UWB anchors 101, 102, 103, 104 and a UWB tag 200 due to loss and multi-pass fading from an influence of metal part of a vehicle 100 in a specific direction.

Referring to FIG. 1A, when the UWB tag is biasedly positioned to the right side of the vehicle, the anchors 103, 104 of UWB anchors 101, 102, 103, 104 may be not properly estimated due to the long distance from the UWB tag 200 and the influence of metal part of the vehicle, and it may make an estimation position error.

FIG. 1B is a view showing actual estimating position value of the UWB anchors 101, 102, 103, 104 and the UWB tag 200 at 2 M distance from outside of the vehicle.

Referring to FIG. 1B, even if the UWB tag 200 is located 2 M distance from the outside of the vehicle, loss and multi-pass fading may occur due to the influence of metal part of the vehicle according to the corresponding positions of ⓐ to ⓗ, and the estimating position value may be resulted from 2 M to 2.7M in various ways.

Therefore, there are a need for solving the problem of loss and multi-pass paging because of metal part of the vehicle, and a need of a method capable of estimating position as accurately as possible regardless of the positions of the UWB anchor and UWB tag.

Accordingly, the present invention may propose the UWB anchor structure capable of estimating position as accurately as possible while taking into account the cost of equipment and the installation space of the estimating position devices.

FIG. 2 is a block diagram showing the structure of N UWB anchors 101,102,103, 104 according to an embodiment of the present invention.

The N UWB anchor 101 may include a Local Interconnection Network (LIN) transceiver (for LIN communication, 101-*f*) for receiving a position estimation signal from the inside of the vehicle, a UWB transceiver (101-*e*) receiving a position estimation signal transmitted from the LIN transceiver (101-*f*) and performing the position estimation with the UWB tag, M antennas (101-*a*, 101-*b*, as an example, two antennas are shown) connected to the UWB transceiver (101-*e*) and spaced apart at regular intervals so that there is no mutual interference, a switch (101-*c*) for performing on/off for the M antennas at a predetermined time difference, a controller (101-*d*) for controlling the devices, and a power supply (101-*g*) for supplying power.

In an embodiment of the present invention, the LIN transceiver may be a CAN transceiver for CAN communication or an ethernet transceiver for ethernet communication.

In an embodiment of the present invention, the M antennas 101-*a*, 101-*b* may be directional or omni-directional antennas.

In an embodiment of the present invention, the M antennas 101-*a*, 101-*b* may be installed in different directions by adjusting an angle.

In an embodiment of the present invention, when the M antennas are directional antennas 101-*a*, 101-*b*, the controller 101-*d* may determine a recognized directivity of the antenna by transmitting a reference signal from the UWB anchors 101, 102, 103, 104 to the UWB tag 200.

FIG. 3 is a layout diagram of two antennas in UWB anchors 101, 102, 103, 104 installed in the vehicle according to an embodiment of the present invention.

Referring to FIG. 3 the two antennas spaced at regular intervals in the UWB anchors 101, 102, 103, 104 may cover broader vehicle areas and estimate the position with the UWB tag 200.

Therefore, by estimating the position with the UWB tag 200 of the smart key while covering more broad areas of the vehicle with only M antennas spaced at regular intervals in the UWB anchor 101, 102, 103, 104 and the switch 101-*c*, the position estimation may be performed without the influence of the multipath fading and the influence of the multipath.

A received signal delay may be measured certain number of times from the M antennas spaced at regular intervals in the UWB anchor 101, 102, 103, 104 to the UWB tag 200 by performing ON/OFF the switch 101-*c* at a certain time difference.

In this case, the received signal delay between the antenna and UWB tag can be reduced because of the reduced influence on the metal part of the vehicle or the multi-fading.

Accordingly, antennas in which the received signal delay value measured a certain number of times is less than or equal to a predetermined threshold value may be determined.

The determined distance between the antennas and the distance between each antenna and UWB tag may be measured, and the position angle with the UWB tag may be determined using Two-Way Ranging (TWR) position estimating based on the distance between the antennas and the distance between each antenna and UWB tag.

FIG. 4 is a view for explaining the TWR position estimating method between the UWB anchors and the UWB tag according to an embodiment of the present invention.

As shown in FIG. 4A, the TWR position estimating method may be one of the TOA methods, which measures reflecting speed by transferring a frequency between a mobile device and a fixed device and converts the reflecting speed into a distance.

Referring to FIG. 4B, by recognizing the distance each antenna of the UWB anchors and UWB tag and the distance between the antennas in the TWR position estimating method and recognizing the included angle between each antenna of the UWB anchors and UWB tag, the angle between each antenna of the UWB anchor and the UWB tag may be more accurately calculated.

That is, the direction of each antenna of the UWB anchor 101, 102, 103, 104 from the UWB tag 200 may be accurately estimated.

Meanwhile, the distance between the N UWB anchors 101, 102, 103, 104 and the UWB tag 200 may be estimated using a triangulation method.

The triangulation method may be a simple geometric method, and the most commonly used method for estimating the real-time position estimation of a moving object on two-dimensional plane in Real Time Position System (RTLS).

Refer to the FIG. 6, in order to estimate the real-time position estimation of the moving object on the two-dimensional plane (hereinafter, only the two-dimensional plane is assumed), at least three reference points may be required.

Let these reference points be AP1, AP2 and AP3. Let the coordinates of each AP be (x1, y1), (x2, y2), (x3, y3) as shown in the FIG. 6. Suppose that the moving object is denoted by M and the current position is (x, y). In addition, the distances from the moving object M to the three reference points are d1, d2 and d3, and the distance between each reference point from the moving object M may be simply calculated by the Pythagorean theorem.

Here, the distances of d1, d2 and d3 may be obtained by various methods. For example, these are obtained by using the relationship with a Received Signal Strength Indication (RSSI), a time of arrival (TOA) or a time difference of arrival (TODA). Therefore, it is assumed here that the distances of d1, d2 and d3 are known. In addition, since the coordinate values of the three reference points are also known, the value of (x, y), which is the current position of the moving object, may be obtained using the above equations (1) to (3).

Using the triangulation method described above with the N UWB anchors and UWB tag, the distance between the UWB anchors and the UWB tag may be determined more accurately.

FIG. 5 is a flowchart illustrating a method of estimating position between the UWB anchor and the UWB tag according to an embodiment of the present invention.

The UWB precise position estimation method for vehicles may include the UWB tag 200 on the smart key and N UWB anchors 101, 102, 103, 104 installed in the vehicle. The UWB anchors 101, 102, 103, 04 include a LIN transceiver to receive a signal related to position estimation from an inside of the vehicle, a UWB transceiver that receives the signal related to position estimation transmitted from the LIN transceiver and performs position estimation with the UWB tag, M antennas connected to the UWB transceiver and spaced apart at regular intervals so that there is no mutual interference, a switch for performing on/off the M antennas at a predetermined time difference, and power supply (101-g) for supplying power A signal related to position estimation may be received from the vehicle interior to the LIN transceiver 101-f, and the signal may be transmitted to the UWB transceiver 101-e to start position estimation (S501).

The controller 101-d may measure the delay of the received signal from the UWB tag 200 with certain number of times while performing ON/OFF each switch for the M antennas 101-a and 101-b with certain time differences (S503).

Antennas in which the received signal delay measured with certain number of times is less than or equal to a predetermined threshold value may be determined (S505).

A distance between the determined antennas and a distance between each antenna and the UWB tag may be measured (S507).

A position angle with the UWB tag 200 may be determined using a Two-Way Ranging (TWR) position estimating based on the distances between determined antennas and the distance between each antenna and the UWB tag 200 (S509).

The distances between the UWB anchors 101, 102, 103, 104 and the UWB tag 200 using the triangulation method for N UWB anchors and UWB tags may be measured (S511).

Based on the position angle with the UWB tag 200 and the distance between the N UWB anchors 101, 102, 103 and 104 and the UWB tag, the position of the UWB tag may be estimated (S513).

The method and system for estimating the position between the vehicle using UWB and the smart according to the embodiment of the present invention as described above may minimize measurement errors and deviations, which may occur due to the type of vehicle and the outer metal material of the vehicle, using a plurality of antenna modules of the UWB anchors.

In addition, there is an effect of enabling precise estimating position with simple method and lower cost without increasing the number of UWB anchors between the vehicle and the smart key.

As described above, the present disclosure has been described with respect to particularly preferred embodiments. However, the present disclosure is not limited to the above embodiments, and it is possible for one who has an ordinary skill in the art to make various modifications and variations, without departing off the spirit of the present disclosure.

What is claimed is:

1. A vehicle Ultra Wide Band (UWB) precision position estimation system comprising
   a UWB tag installed in a key module; and
   N UWB anchors installed in a vehicle,
      wherein a UWB anchor including
         a Local Interconnection Network (LIN) transceiver to receive a signal related to position estimation from an inside of the vehicle,
         a UWB transceiver that receives the signal related to position estimation transmitted from the LIN transceiver and performs position estimation with the UWB tag,
         M antennas connected to the UWB transceiver and spaced apart at regular intervals so that there is no mutual interference, a switch for performing on/off of M antennas at a predetermined time difference,
         a controller for performing the switch ON/OFF with the predetermined time difference, measuring a delay of received signal from the UWB tag with certain number of times, determining antennas in which the measured delay of received signal with the certain number of times is less than or equal to a predetermined threshold value, determining a UWB tag position angle based on distances between the determined antennas and distances between each antenna and UWB tag using Two-Way Ranging (TWR) position estimating, measuring the distance between UWB anchor and UWB tag measured using a triangulation method for N UWB anchors installed in the vehicle and UWB tag, and controlling said each device to estimate the UWB tag position based on the measured position angle and distance, and
      power supply for supplying power.

2. The vehicle UWB precision position estimation system of claim 1, wherein the M antennas are directional or omni-directional.

3. The vehicle UWB precision position estimation system of claim 1, wherein the M antennas are installed in different directions by adjusting the angle.

4. The vehicle UWB precision position estimation system of claim 1, if the M antennas are directional antennas, the controller determines the directivity of the antennas by transmitting a reference signal from the UWB anchor to the UWB tag and recognizing a direction of the UWB tag.

5. A method of vehicle Ultra Wide Band (UWB) precision position estimation, comprising:
   wherein a system includes a UWB tag installed in a key module and N UWB anchors installed in a vehicle, and a UWB anchor includes a Local Interconnection Network (LN) transceiver to receive a signal related to position estimation from an inside of the vehicle, a UWB transceiver that receives the signal related to position estimation transmitted from the LIN transceiver, M antennas connected to the UWB transceiver and spaced apart at regular intervals so that there is no mutual interference, a switch for operating of the M antennas, and a controller for controlling above devices,
   receiving a position estimation related signal from the vehicle interior to the LIN transceiver and transmitting the signal to the UWB transceiver to start position estimation;
   measuring, in the controller, a delay of a received signal with the UWB tag with certain number of times while performing ON/OFF of each switch for the M antennas at a certain time difference;

determining antennas in which the received signal delay measured with certain number of times is less than or equal to a predetermined threshold value;

measuring a distance between the determined antennas and a distance between each antenna and the UWB tag;

determining a position angle from the UWB tag using Two-Way Ranging (TWR) position estimating based on the distance between the antennas and the distance between each antenna and the UWB tag;

measuring a distance between the UWB anchor and the UWB tag measured using a triangulation method for N UWB anchors and UWB tags; and estimating a position of the UWB tag based on the position angle from the UWB tag and the distance between the N UWB anchors and UWB tags.

6. The method of the vehicle UWB precision position estimation of claim 5, wherein the M antennas are directional or omni-directional.

7. The method of the vehicle UWB precision position estimation of claim 5, wherein the M antennas is installed in different directions by adjusting the angle.

8. The method of a vehicle UWB precision position estimation of claim 5, if the M antennas are directional antennas, the controller determines the directivity of the antennas by transmitting a reference signal from the UWB anchor to the UWB tag and recognizing a direction of the UWB tag.

* * * * *